April 11, 1967 C. E. HEIN 3,313,125
FLEXIBLE COUPLING
Filed April 22, 1965
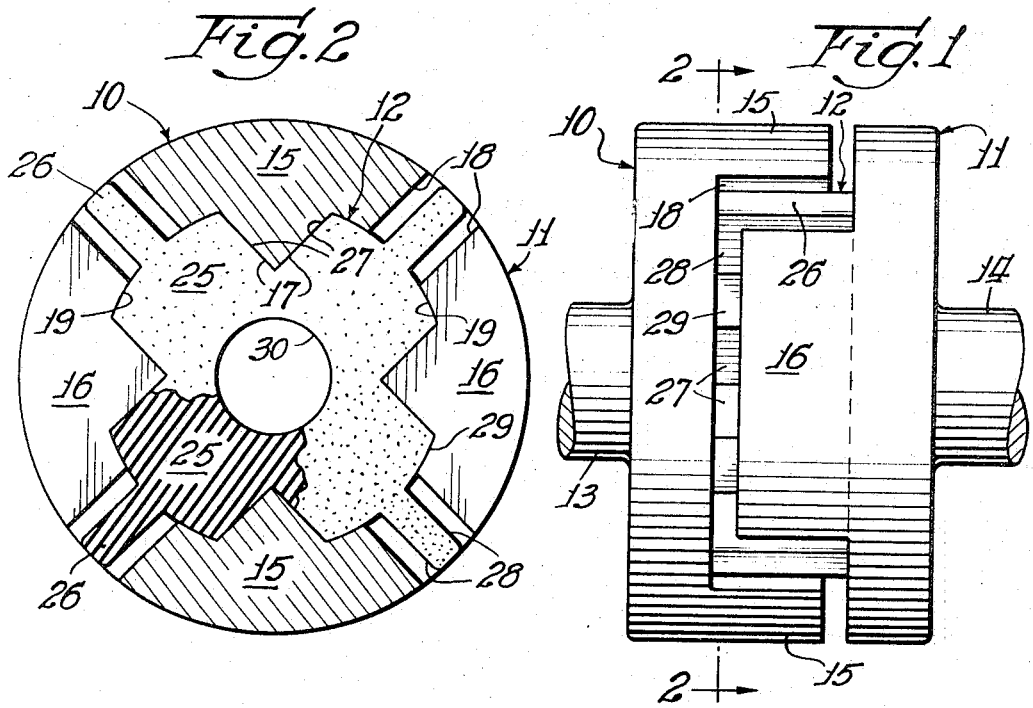
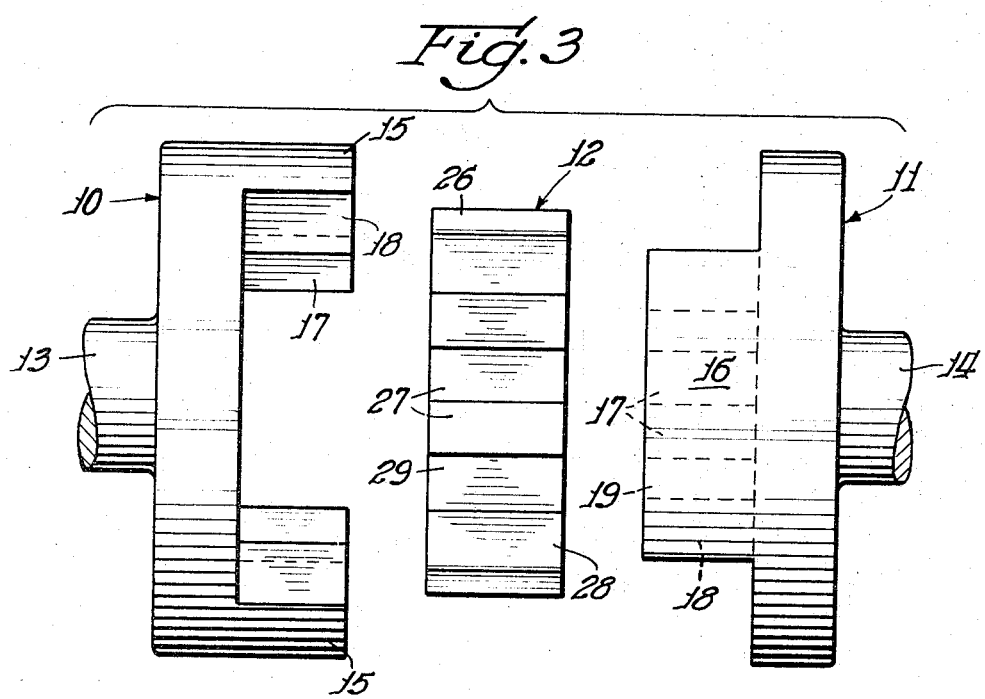
Inventor:
Charles E. Hein
By: Evan D. Roberts
Atty.

United States Patent Office 3,313,125
Patented Apr. 11, 1967

3,313,125
FLEXIBLE COUPLING
Charles E. Hein, Newfield, N.Y., assignor to Morse Chain Company, Ithaca, N.Y., a corporation of New York
Filed Apr. 22, 1965, Ser. No. 450,065
4 Claims. (Cl. 64—14)

This invention relates to a flexible coupling, and in particular, to an improved resilient flexible coupling having a multiple spring rate deflection.

The generally known type of coupling, upon which this invention is an improvement, is that type of coupling which is utilized for resiliently connecting substantially aligned rotatable shafts, by a drive and a driven flange or hub member respectively secured to the shafts and interconnected by a resilient spider-like connecting member. The drive and driven flange or hub members each have spaced-apart axially projecting lugs which are angularly interpositioned with the lugs of the other flange member with the resilient spider positioned in the space interconnecting relationship with the drive and driven members.

The known types of couplings provide a resilient interconnection between shafts which may have a slight misalignment or angularity, and in addition, tend to provide a resilient interconnection between the drive and driven shafts. Quite often these flexible resilient couplings have disadvantageous results. In particular, these couplings often require curved mating surfaces between the resilient elements thereof, and the remaining elements of the coupling to provide a resilient effect. Further, the known types of flexible resilient couplings often require bonding or other extra means for positively securing the resilient elements of the coupling to the remaining portions of the coupling. In addition, existing flexible couplings tend to exert a shear, as well as a compressive load to the resilient elements thereof, and for this reason, in addition to others immediately stated above, the existing flexible resilient couplings tend to become complex, expensive to manufacture, difficult and dangerous to maintain, and relatively short lived. It is therefore highly advantageous to provide an improved flexible resilient coupling which will overcome one or more of the objectionable characteristics of the existing flexible resilient couplings.

It is therefore an object of this invention to provide a flexible resilient coupling, which is relatively long lived, and simple and economical to manufacture and maintain with safety.

It is another object of this invention to provide a flexible resilient coupling having only flat force transmitting mating surfaces between the resilient elements and the remaining elements of the coupling.

It is a further object of this invention to provide a flexible resilient coupling wherein a resilient element provides an interconnection within the coupling without requiring bonding or other extra means for securing the resilient element to the remaining elements of the coupling.

It is another object of this invention to provide a resilient flexible coupling having a resilient interconnecting element which is generally under compressive load only, rather than a shear load in addition to a compressive load.

It is a primary object of this invention to provide a flexible resilient coupling having a multiple resilient spring rate between the drive and driven members thereof.

With these and other objects in view, the present invention provides an improved flexible resilient coupling wherein a drive member and a driven member are resiliently interconnected by a spider member, and which are provided with interpositioned and interrelated novel structures that provide a multiple spring rate torque transmitting coupling.

Other objects, advantages, and novel aspects of the invention will become apparent upon consideration of the following detailed description, in conjunction with the accompanying drawings wherein:

FIG. 1 is a side view of the flexible resilient coupling of this invention with the coupling in the assembled operable condition;

FIG. 2 is a sectional view taken along line 2—2 of FIG. 1 showing the unique flat mating surface configuration of the elements of the coupling; and FIG. 3 is an expanded view of the flexible resilient coupling showing the interrelationship of the elements of the coupling.

Reference to the drawings, there is illustrated the flexible resilient coupling of this invention which is provided with a drive flange generally designated by the numeral 10, a driven flange member generally designated by the numeral 11, and a resilient spider member generally designated by the numeral 12. The drive flange member 10 is drivingly secured to or otherwise formed as part of a drive shaft 13, and similarly, the driven flange 11 is drivingly secured to or otherwise formed as part of a driven shaft 14.

The drive flange is provided with axially extended and angularly spaced-apart lug projections 15. The driven flange 11 is similarly provided with axially extended and angularly spaced-apart lug projections 16. Each of the lugs 15 and 16 is provided with chordal, flat opposed inner surfaces 17, outer chordal flat opposed surfaces 18, and interconnecting surfaces 19.

The resilient interconnecting spider member 12 is provided with radially extended inner portions 25, and outer portions 26 extending radially from and beyond the inner portions 25. The inner portions 25 are provided with flat chordal opposed surfaces 27, and the outer portions 26 are provided with flat chordal opposed surfaces 28. The flat inner surfaces 27 are in complemental engagement with the flat control surfaces 17 of the lugs 15 and 16. The surfaces 28 of the outer spider projections 26 are spaced from the adjacent flat facing outer chordal surfaces of the lugs 15 and 16. The surfaces 28 of the outer projections of the spider 26 and the inner surfaces 27 of the inner projections 25 of the spider 12 are each respectively interconnected by surfaces 29, which are generally complementary with the surfaces 19 of the lugs 15 and 16. The resilient spider 12 can also be provided with an axial or similar opening 30.

It should be noted that although ony two lugs 15 and 16 are provided on the drive and driven flange members 10 and 11 respectively, and four projections 25 and 26 on the resilient spider member 12, it will become readily apparent upon full analysis of the invention disclosed herein, that additional lugs 15 and 16 and projections 25 and 26 could be provided in angular spaced-apart relation. Also, it should be noted that the resilient spider member 12 is retained between the interpositioned projections 15 and 16 of the drive and driven members without any special retaining means in addition to the particular configuration of the lugs 15 and 16 and the spider 12 as described herein.

Further, although the spider 12 is shown with two radially outward diminishing projection and cooperating space steps respectively provided by the inner and outer projections 25 and 26, and the radially outwardly diminishing stepped spaces between the projections 15 and 16, this invention is not limited to a two-step structure. More particularly, the coupling as taught by this invention could be provided with a series of two or more radially outer diminishing stepped projections on the spider, and the lugs 15 and 16 could correspondingly be provided with radially outwardly diminishing stepped cooperating spaces therebetween for consecutively receiving the series of spider projections as the torque is increased. Thus the coupling of this invention could provide a number of angular deflection spring rates equal to the number of stepped projections and cooperating stepped spaces between the lugs 15 and 16.

OPERATION

The coupling of this invention, when assembled (FIGS. 1 and 2) and under no load conditions, has the inner thick projections 25 of the spider 12 is a close-fit relationship with the respective lugs 15 and 16 of the coupling flanges 10 and 11, and the thin projecting portions 26 of the spider 12 are spaced from the respective adjacent facing surfaces 18 of the lugs 15 and 16 of the coupling flanges 10 and 11.

When a relatively small torsional force is applied to the drive flange 10 through the drive shaft 13, the torsional force thus applied is transmitted through the lugs 15 of the drive flange 10 to the inner projections 25 of the resilient spider member 12 through the close-fitted flat chordal surfaces 17 and 27 of the lugs 15 and the spider 12 respectively.

The torsional force is thereupon transmitted from the resilient spider member 12 to the lugs 16 of the driven flange member 11, and the driven shaft 14 through the remaining opposed flat close-fitted chordal surfaces 27 and 17 of the inner projections 25 of the resilient spider 12 and the remaining opposed flat chordal surfaces 17 of the driven lugs 16. The driven flange 11 will tend to resist to torsional force applied to the drive flange 10 causing an angular deflection therebetween. Under these conditions, the interconnecting spider 12 provides a given spring rate determined by the compressive resistance of the projections 25 thereof. Under moderate torsional load conditions, the torsional load will result in the substantially pure compressional reaction in the inner projection of the resilient spider 12.

If the torsional force is increased, the torque will continue to be transmitted through the resilient spider member 12 by compression of the thicker inner portions 25 thereof. However, as the torsional force is increased, the compressive deflection of the thick inner portions 25 of the spider 12 will be such that the lugs 15 and 16 will eventually contact the thinner outer projection portions 26 of the resilient spider 12 between the flat chordal facing surfaces 18 of the lugs 15 and 16. When this occurs, the outer projecting portions 26 of the resilient spider 12 will compressibly resist further relative angular deflection between the lugs 15 of the coupling drive flange and the lugs 16 of the coupling driven flange. The additional compressive resistance of the outer projections 26 will thus change the spring rate of the coupling to provide a second stiffer spring rate determined by the total compressive resistance of the thick inner projections 25 and the thinner outer projections 26 of the spider 12.

Thus, it can be seen that the novel configuration of the drive and driven coupling flanges 10 and 11, and the interconnecting spider 12 provide a coupling having one spring rate for low torsion deflection, and another stiffer spring rate for a higher torsional deflection, and in all instances the deflection is resisted by essentially compressive reaction within the spider 12 with little or no shear resistance therein.

Further, it should be noted that the resilient coupling of this invention provides a multiple spring rate coupling rather than merely a variable spring rate coupling. The coupling provides the two compressive resistances to deflection as set forth above with respect to the inner and outer projections 25 and 26 respectively of the spider 12. In this regard, it should be further noted that the spider 12 could be provided with more than two radial projections such as 25 and 26 which diminish in size from large inner projections to a small outer projection, and the lugs 15 and 16 could also be provided with flat chordal surfaces adapted to respectively complementally engage the sides of the diminishing projections.

It is to be understood that the invention is not to be limited to the specific constructions and arrangements shown and described, except only insofar as the claims may be so limited, as it will be understood to those skilled in the art that changes may be made without departing from the principles of the invention.

What is claimed is:

1. A flexible coupling comprising a drive member having two axially extending drive lugs, a driven member having two axially extending driven lugs alternately positioned between the drive lugs in angular spaced relation therewith, said driving and driven lugs having one set of chordal surfaces defining one radial portion thereof and having other chordal surfaces defining another radial portion thereof, and a resilient cushion spider member positioned radially within said drive and driven lugs and having projecting portions extending radially between said lugs, said radially extended cushion portions being in engagement with said one set of surfaces of said lugs between and along said one portion of the radial length of said lugs and said other portions in parallel spaced relation with respect to said lugs adjacent said other chordal surfaces of said lugs for the remaining length of said extended cushion portions.

2. A flexible coupling comprising a drive member having two axially extending drive lugs, a driven member having two axially extending driven lugs alternately positioned between the drive lugs in angular spaced relation therewith, said drive and driven lugs having radially inner chordal surfaces defining an inner radial portion thereof and having radially outer chordal surfaces defining an outer radial portion thereof, and a resilient cushion member positioned radially within said drive and driven lugs and having projecting portions respectively extending radially between said lugs, said radially extended cushion portions having radially inner portions in respective complementary engagement with the radially inner chordal surfaces of said lugs for providing a compressive resistance to relative angular deflection between said drive lugs and said driven lugs to provide a given initial angular compressive spring rate within the coupling, said radially outer extended cushion portions having chordal surfaces respectively parallel to and spaced from said radially outer chordal surfaces of said lugs so that the radially outer projections of said cushion will be complementally and compressibly engaged by the respective outer chordal surfaces of said lugs when said radially inner projections of said cushion are sufficiently compressed under torsional deflection to cause a predetermined second relative angular spring rate deflection between said lugs of said drive member and said driven member to provide a second compressive spring rate between the drive and driven members.

3. A flexible coupling comprising a drive member having two axially extending drive lugs, a driven member having two axially extending driven lugs alternately positioned between the drive lugs in angular spaced relation therewith, said lugs of said drive and said driven members having interfacing stepped chordal surfaces defining a space therebetween having a respective angular dimension that diminishes radially outward between the stepped chordal surfaces of the lugs, and a resilient cushion member positioned radially within said drive and said driven lugs and having projecting portions extending radially between said lugs, one or more of said radially extended cushioned portions being in engagement with the same number of radially interfacing stepped chordal surfaces of said lugs, and the remaining extended cushion portions being angularly spaced from said remaining outer stepped chordal surfaces of said lugs so that the remaining projections will be complementally and compressibly engaged in sequence by the respective remaining outer chordal surfaces of said lugs when said radial inner projections of said cushion are sufficiently compressed under torsional angular deflection between said lugs to cause a predetermined relatively angular deflection between said lugs of said drive member and said driven member to provide an additional compressive spring rate for each additional spaced projection of said cushion between the drive and driven members.

4. A flexible coupling comprising a drive member having two axially extending drive lugs, a driven member having two axially extending driven lugs alternately positioned between the drive lugs in angular spaced relation therewith, said drive and driven lugs having radially outwardly diminishing chordal stepped surfaces, and a resilient cushion member positioned radially within said drive and driven lugs and having radially outwardly diminishing chordal stepped projection portions extending radially between said lugs, said innermost projection portion of said cushion being in complemental engagement with the innermost chordal stepped surfaces of said drive and driven lugs and the remaining projection portions being respectively angularly spaced between the remaining chordal stepped surfaces of said drive and driven lugs so as to be radially outwardly successively respectively engageable with said remaining stepped chordal surfaces of said lugs upon radial outward successive compression of said projection portions when the relative angular deflection between said drive and said driven lugs is increased by a differential increase in torsional and resistance force between said drive lugs and said driven lugs.

References Cited by the Examiner
UNITED STATES PATENTS

| 2,003,848 | 6/1935 | Grundy | 64—14 |
| 2,025,828 | 12/1935 | Ricefield | 64—14 |

FRED C. MATTERN, Jr., *Primary Examiner.*

HALL C. COE, *Examiner.*